United States Patent
Lemmers, Jr. et al.

(10) Patent No.: US 9,759,305 B2
(45) Date of Patent: Sep. 12, 2017

(54) PLANET GEAR FOR AN INTEGRATED DRIVE GENERATOR

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 163 days.

(21) Appl. No.: 14/677,631

(22) Filed: Apr. 2, 2015

(65) Prior Publication Data
US 2016/0290467 A1 Oct. 6, 2016

(51) Int. Cl.
*F16H 55/08* (2006.01)
*F16H 55/17* (2006.01)
*F16H 57/08* (2006.01)

(52) U.S. Cl.
CPC .............. *F16H 55/08* (2013.01); *F16H 55/17* (2013.01); *F16H 57/08* (2013.01)

(58) Field of Classification Search
CPC .......... F16H 55/08; F16H 55/17; F16H 57/08; F16H 48/38
See application file for complete search history.

(56) References Cited

U.S. PATENT DOCUMENTS

| | | | |
|---|---|---|---|
| 2,288,206 A * | 6/1942 | Pierpont | F16H 3/60 475/325 |
| 3,043,090 A | 7/1962 | Sundt | |
| 3,527,121 A | 9/1970 | Moore | |
| 4,252,035 A | 2/1981 | Cordner et al. | |
| 4,488,053 A | 12/1984 | Cronin | |
| 4,609,842 A | 9/1986 | Aleem et al. | |
| 4,617,835 A * | 10/1986 | Baker | F16H 3/663 475/39 |
| 4,734,590 A | 3/1988 | Fluegel | |
| 4,953,663 A | 9/1990 | Sugden | |
| 4,965,477 A | 10/1990 | Stadler et al. | |
| 5,028,803 A | 7/1991 | Reynolds | |
| 5,472,383 A | 12/1995 | McKibbin | |

(Continued)

FOREIGN PATENT DOCUMENTS

| | | |
|---|---|---|
| CN | 101059167 A | 10/2007 |
| WO | 2015004385 A1 | 1/2015 |

OTHER PUBLICATIONS

Extended European Search Report for EP Application No. 16163668.3-1762, dated Mar. 7, 2017, pp. 1-8.

(Continued)

*Primary Examiner* — Tisha Lewis
(74) *Attorney, Agent, or Firm* — Cantor Colburn LLP

(57) ABSTRACT

A planet gear for an integrated drive generator includes a planet gear body having an outer diametric surface provided with fifteen (15) gear teeth. The integrated drive generator can include a housing that surrounds an input system. The input system can be operatively coupled to a variable speed drive source. The integrated drive generator can also include a generator and an epicyclic differential gear system.

11 Claims, 4 Drawing Sheets

(56) References Cited

U.S. PATENT DOCUMENTS

| | | | |
|---|---|---|---|
| 5,728,022 A * | 3/1998 | Schultz | B60K 17/08 |
| | | | 475/204 |
| 5,845,731 A | 12/1998 | Buglione et al. | |
| 6,178,840 B1 * | 1/2001 | Colbourne | F16H 55/08 |
| | | | 74/421 R |
| 6,258,004 B1 | 7/2001 | Johnston | |
| 6,387,004 B1 | 5/2002 | Parrish | |
| 6,799,953 B2 | 10/2004 | Nelson | |
| 6,893,208 B2 | 5/2005 | Frosini et al. | |
| 7,195,578 B2 * | 3/2007 | Dalenberg | F16H 57/04 |
| | | | 475/331 |
| 7,472,547 B2 | 1/2009 | Grosskopf et al. | |
| 8,187,141 B2 | 5/2012 | Goleski et al. | |
| 8,267,826 B2 | 9/2012 | Duong et al. | |
| 8,485,936 B2 | 7/2013 | Makulec et al. | |
| 8,925,421 B2 | 1/2015 | Vanderzyden et al. | |
| 9,115,794 B2 | 8/2015 | Vanderzyden et al. | |
| 9,410,572 B2 | 8/2016 | Shoup et al. | |
| 2001/0003108 A1 | 6/2001 | Goi et al. | |
| 2004/0042698 A1 | 3/2004 | Yamamoto et al. | |
| 2005/0006164 A1 | 1/2005 | Teraoka | |
| 2006/0205560 A1 | 9/2006 | Meier | |
| 2008/0108471 A1 | 5/2008 | Deutsch et al. | |
| 2009/0101465 A1 | 4/2009 | Hart et al. | |
| 2009/0203492 A1 | 8/2009 | Okabe | |
| 2010/0167863 A1 | 7/2010 | Lemmers, Jr. | |
| 2010/0284836 A1 | 11/2010 | Grosskopf et al. | |
| 2011/0105270 A1 | 5/2011 | Matsuoka et al. | |
| 2011/0314963 A1 | 12/2011 | Poisson | |
| 2013/0068057 A1 * | 3/2013 | Grosskopf | F16H 1/26 |
| | | | 74/414 |
| 2013/0172145 A1 | 7/2013 | Mourani | |
| 2013/0260951 A1 | 10/2013 | Norem et al. | |
| 2013/0288840 A1 | 10/2013 | Grosskopf et al. | |
| 2014/0008170 A1 | 1/2014 | Vanderzyden et al. | |
| 2014/0009125 A1 | 1/2014 | Vanderzyden et al. | |
| 2014/0130356 A1 | 5/2014 | Jiang et al. | |
| 2015/0013488 A1 | 1/2015 | Matsuoka et al. | |
| 2015/0125277 A1 | 5/2015 | Ward | |
| 2016/0003339 A1 | 1/2016 | Roberts, III et al. | |
| 2016/0016368 A1 | 1/2016 | Kunishima | |
| 2016/0032969 A1 | 2/2016 | Kovach et al. | |
| 2016/0215815 A1 | 7/2016 | Ryu et al. | |

OTHER PUBLICATIONS

Extended European Search Report for EP Application No. 16163674.7-1762, dated Mar. 7, 2017, pp. 1-7.

* cited by examiner

PLANET GEAR FOR AN INTEGRATED DRIVE GENERATOR

BACKGROUND

Exemplary embodiments pertain to the art of integrated drive generators and, more particularly, to a planet gear for an integrated drive generator.

Many aircraft employ constant speed drives to provide a motive force to a generator. The generator, typically an alternating current (AC) generator, produces an electrical output. Generally, it is desirable for the electrical output to be at a constant frequency. To produce the desired constant frequency, it is further desirable to drive the generator at a constant speed. The constant speed drive provides an interface between an aircraft engine output and the generator. The constant speed drive converts a variable speed input from the aircraft engine to a constant speed output that provides the desired motive force to the generator. In some cases, the constant speed drive and the generator are combined to form an integrated drive generator.

BRIEF DESCRIPTION

Disclosed is a planet gear for an integrated drive generator (IDG) including a planet gear body having an outer diametric surface provided with 15 gear teeth.

Also disclosed is an integrated drive generator (IDG) including a housing, and a differential gear system arranged within the housing. The differential gear system includes at least one planet gear having a planet gear body including an outer diametric surface provided with 15 gear teeth.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
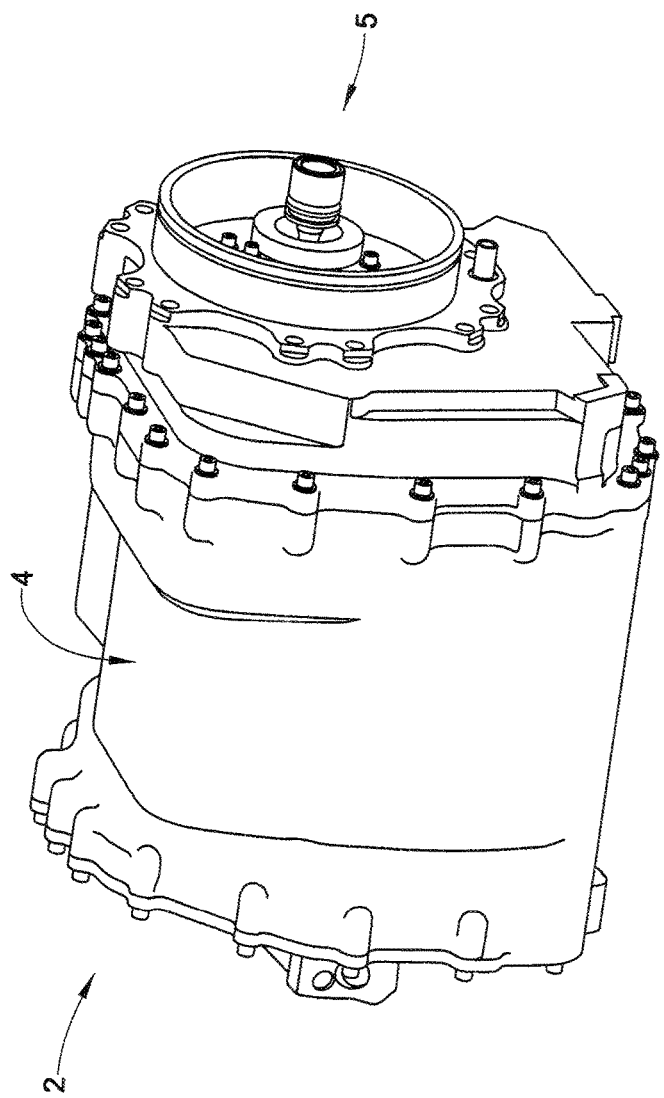
FIG. 1 depicts an integrated drive generator including a differential gear system having a planet gear, in accordance with an exemplary embodiment.
Figure 2:
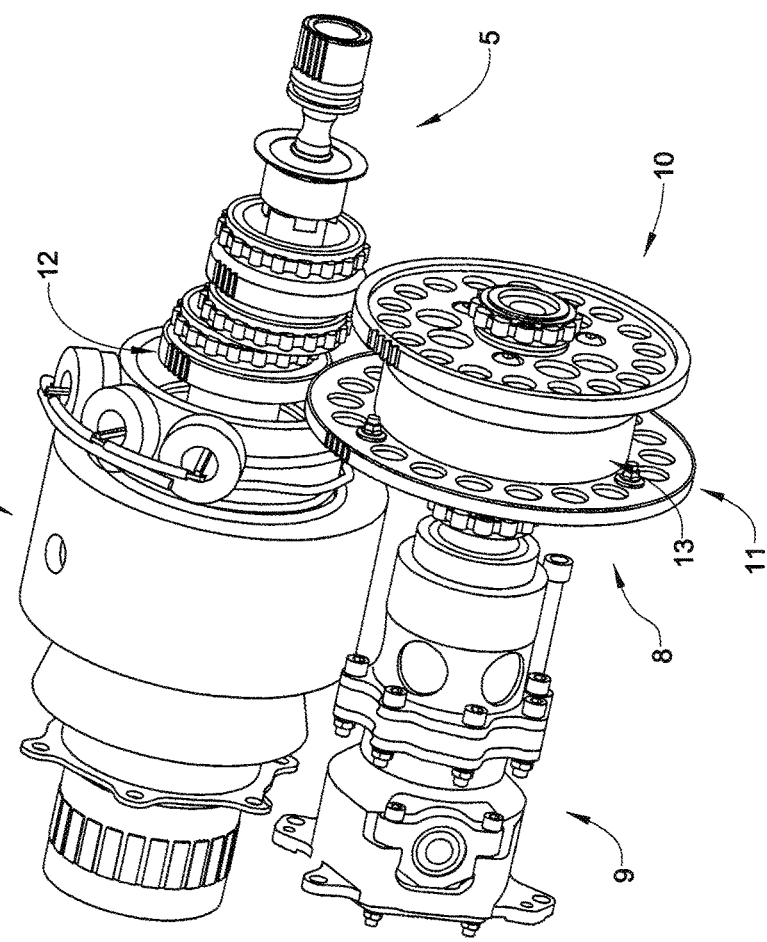
FIG. 2 depicts a generator and a differential gear system, in accordance with an exemplary embodiment.
Figure 3:
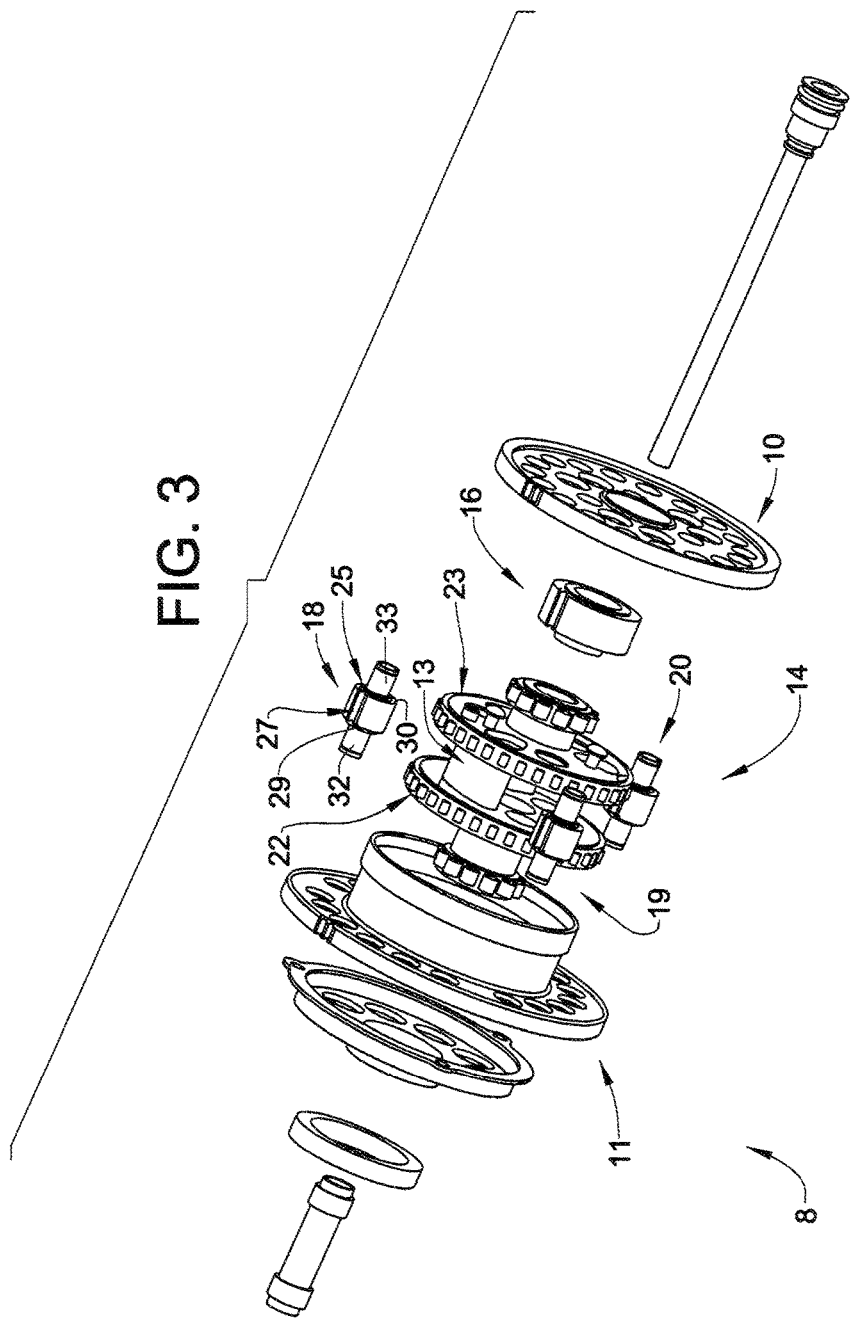
FIG. 3 depicts a partially exploded view of the differential gear system of FIG. 2.

An integrated drive generator (IDG), in accordance with an exemplary embodiment, is indicated generally at 2, in FIGS. 1-3. IDG 2 includes a housing 4 that surrounds an input system 5 operatively coupled to a variable speed drive source (not shown), a generator 6 and an epicyclic differential gear system 8 coupled to a hydraulic unit 9. As will be detailed more fully below, epicyclic differential gear system 8 converts a variable speed input from variable speed drive source into a constant speed output employed to drive generator 6. In accordance with an aspect of an exemplary embodiment, the variable speed drive source takes the form of an aircraft engine. However, it should be understood, that the variable speed drive source may take on a variety of forms.

Epicyclic differential gear system 8 includes an input driven gear 10 coupled to input system 5 and an output or ring gear 11. Ring gear 11 engages with a driven gear 12 on generator 6. Ring gear 11 is also coupled to a carrier 13. Carrier 13 also supports a planet gear system 14 and a sun gear 16. Sun gear 16 is operatively connected to hydraulic system 9. Planet gear system 14 includes a first planet gear 18, a second planet gear 19, and a third planet gear 20. First, second, and third planet gears 18-20 are supported for rotation between a first planet gear support 22 and a second planet gear support 23 of carrier 13.

Figure 4:
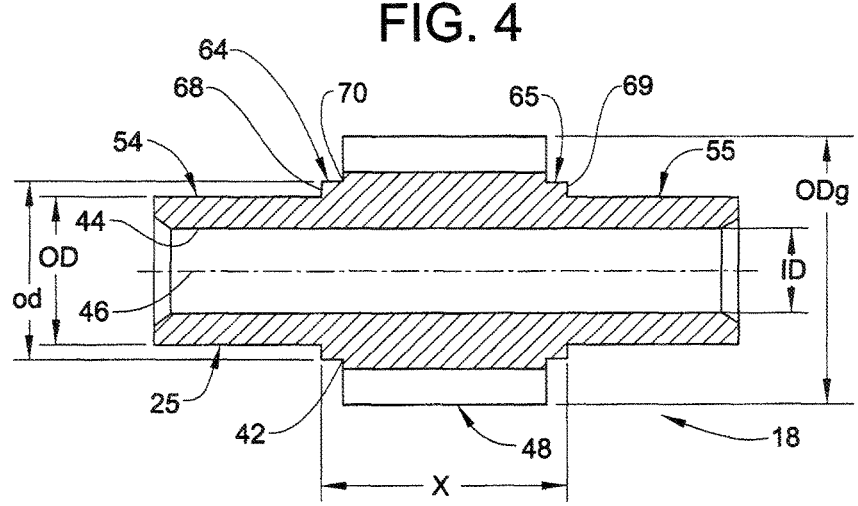
FIG. 4 depicts a planet gear, in accordance with an exemplary embodiment.
Figure 5:
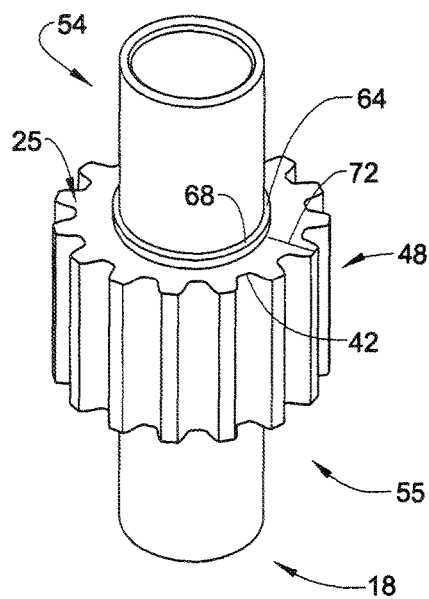
FIG. 5 is a partially cut away view of the planet gear of FIG. 4 illustrating a number of outer gear teeth.
Figure 6:
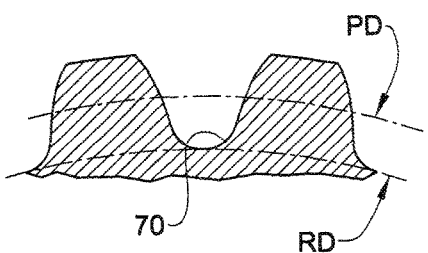
FIG. 6 depicts a cut away side view of the planet gear of FIG. 4.

As each planet gear 18-20 is substantially similarly formed, a detailed description will follow with reference to FIGS. 4-6 in describing planet gear 18 with an understanding that planet gears 19 and 20 include similar structure. Planet gear 18 includes a planet gear body 25 including an outer diametric edge 42 and an inner diametric wall 44 having a center 46. Outer diametric edge 42 includes a plurality of outer gear teeth 48. Outer gear teeth 48 are 15 in number, in accordance with an exemplary embodiment. Planet gear 18 also includes first and second opposing axles 54 and 55. Each axle 54 and 55 includes corresponding first and second thrust shoulders 64 and 65 having first and second thrust surfaces 68 and 69. Thrust surfaces 68 and 69 axially trap planet gear 18 between first and second planet gear supports 22 and 23.

In accordance with an exemplary embodiment, planet gear 18 includes a root diameter (RD) or a diameter of planet gear body 25 defined between base portions 70 of opposing ones of outer gear teeth 48 through center 46. In accordance with an aspect of an exemplary embodiment, the root diameter of outer gear teeth 48 is a root diameter of between about 0.607-inch (1.54-cm) and about 0.620-inch (1.574-cm). In accordance with another aspect of an exemplary embodiment, the root diameter is about 0.620-inch (1.574-cm). In further accordance with an exemplary embodiment, outer gear teeth 48 include a pitch diameter (PD) of about 0.750-inch (1.905-cm).

In further accordance with an exemplary embodiment, first axle 54 includes an outer diameter (OD) of between about 0.4620-inch (1.174-cm) and about 0.4625-inch (1.175-cm). In accordance with another exemplary aspect, first axle, 54 includes an outer diameter of about 0.4625-inch (1.175-cm). Second axle 55 may be similarly formed. In still further accordance with an exemplary embodiment, first thrust shoulder 64 includes an outer diameter (OD) of between about 0.563-inch (1.430-cm) and about 0.573-inch (1.455-cm). In accordance with another aspect of an exemplary embodiment, first thrust shoulder 64 includes an outer diameter of about 0.568-inch (1.443-cm).

In accordance with still yet another aspect of an exemplary embodiment, first thrust surface 68 is spaced from the second thrust surface 69 by a distance of between about 0.789-inch (2.004-cm) and about 0.793-inch (2.014-cm). In accordance with yet another aspect of an exemplary embodiment, first thrust surface 68 is spaced from second thrust surface 69 by a distance "X" of about 0.791-inch (2.009-cm). In accordance with yet another aspect of an exemplary embodiment, planet gear body 25 includes a radius 72 between first thrust shoulder 64 and outer gear teeth 48. In accordance with an aspect of an exemplary embodiment, radius 72 is between about 0.037 inch and about 0.057 inch.

In accordance with another aspect of an exemplary embodiment, radius 72 is about 0.047 inch.

In accordance with yet another aspect of an exemplary embodiment, outer gear teeth 48 include a helix angle lead-in angle of about 0.000-inch and a base radius of about 0.3399-inch (0.8633-cm). In accordance with another aspect of an exemplary embodiment, outer gear teeth 48 define an outer diameter (OD) of planet gear body 25 of between about 0.852-inch (2.164-cm) and about 0.855-inch (2.172-cm). In accordance with another aspect of an exemplary embodiment, outer gear teeth 48 define an outer diameter of the planet gear body 25 of about 0.855-inch (2.172-cm). Further, inner diametric wall 44 defines an inner diameter (ID) of first and second axles 54 and 55 between about 0.276-inch (0.7010-cm) and about 0.286-inch (0.726-cm). In accordance with yet another aspect of an exemplary embodiment, inner diametric wall 44 defines an inner diameter of about 0.281-inch (0.714-cm). The planet gear 18, in accordance with an exemplary embodiment functions with a desired variable speed input epicyclic differential gear system 8 while maintaining a desired form factor that is accommodated by housing 4.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "about" is intended to include the degree of error associated with measurement of the particular quantity based upon the equipment available at the time of filing the application. For example, "about" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A planet gear for an integrated drive generator (IDG) comprising:
    a planet gear body having an outer diametric surface provided with 15 gear teeth,
    wherein the planet gear body includes a first axle and an opposing, second axle, at least one of the first and second axles including an outer diameter of between about 0.4620-inch (1.174-cm) and about 0.4625-inch (1.175-cm), and
    wherein the first axle includes a first thrust surface and the second axle includes a second thrust surface, at least one of the first and second thrust surfaces including an outer diameter of between about 0.563-inch (1.430-cm) and about 0.573-inch (1.455-cm).

2. The planet gear according to claim 1, wherein the 15 gear teeth include a root diameter of between about 0.607-inch (1.54-cm) and about 0.620-inch (1.574-cm).

3. The planet gear according to claim 1, wherein the 15 gear teeth include a root diameter of about 0.620-inch (1.574-cm).

4. The planet gear according to claim 1, wherein the 15 gear teeth define an outer diameter of the planet gear body of between about 0.852-inch (2.164-cm) and about 0.855-inch (2.172-cm).

5. The planet gear according to claim 1, wherein the 15 gear teeth include a pitch diameter of about 0.750-inch (1.905-cm).

6. The plant gear according to claim 1, wherein the first thrust surface is spaced from the second thrust surface by a distance of between about 0.789-inch (2.004-cm) and about 0.793-inch (2.014-cm).

7. The planet gear according to claim 1, wherein the 15 gear teeth include a helix angle lead-in angle of about 0.000-inch and a base radius of about 0.3399-inch (0.8633-cm).

8. An integrated drive generator (IDG) comprising:
    a housing; and
    a differential gear system arranged within the housing, the differential gear system including at least one planet gear having a planet gear body including an outer diametric surface provided with 15 gear teeth,
    wherein the planet gear body includes a first axle and an opposing, second axle, at least one of the first and second axles including an outer diameter of between about 0.4620-inch (1.174-cm) and about 0.4625-inch (1.175-cm), and
    wherein the first axle includes a first thrust surface and the second axle includes a second thrust surface, at least one of the first and second thrust surfaces including an outer diameter of between about 0.563-inch (1.430-cm) and about 0.573-inch (1.455-cm).

9. The integrated drive generator according to claim 8, wherein the 15 gear teeth include a root diameter of between about 0.607-inch (1.54-cm) and about 0.620-inch (1.574-cm).

10. The integrated drive generator according to claim 8, wherein the 15 gear teeth define an outer diameter of the planet gear body of between about 0.852-inch (2.164-cm) and about 0.855-inch (2.172-cm).

11. The integrated drive generator according to claim 8, wherein the 15 gear teeth include a helix angle lead-in angle of about 0.000-inch and a base radius of about 0.3399-inch (0.8633-cm).

* * * * *